Sept. 9, 1930.    F. G. WACKER ET AL    1,775,230
CYLINDER GRINDING TOOL
Filed May 31, 1927    2 Sheets-Sheet 2
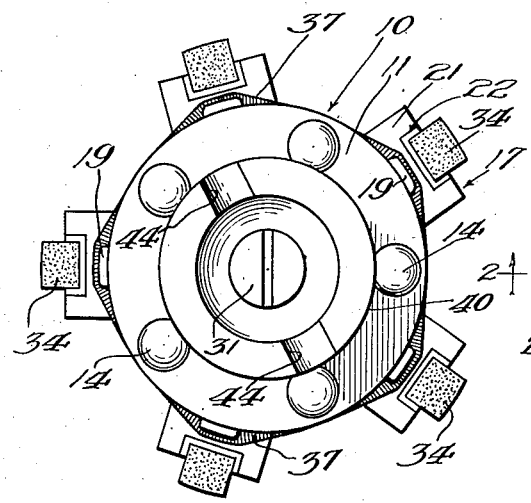
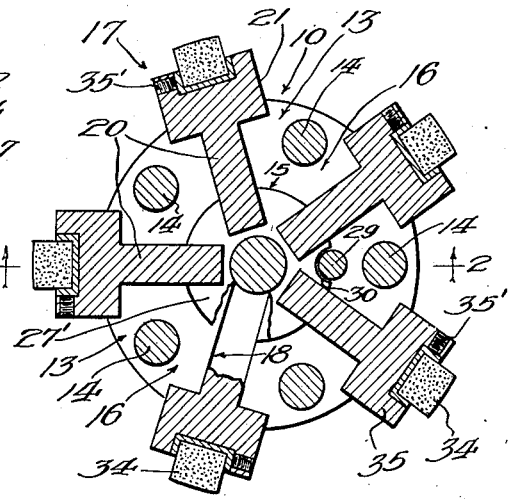
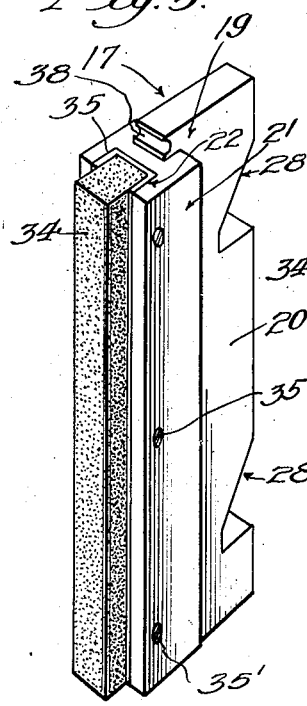
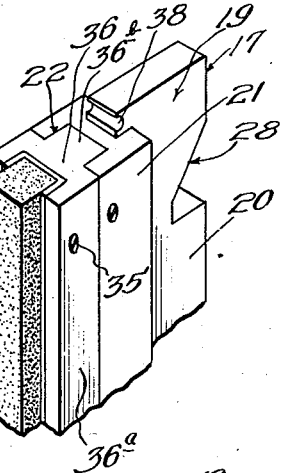
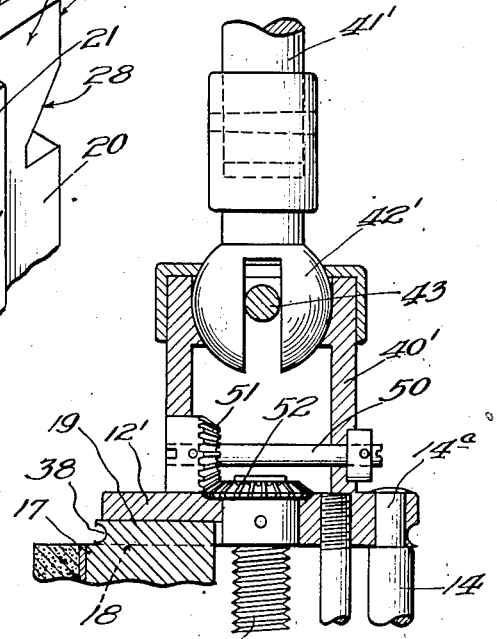
Inventors:
Frederick G. Wacker and
Herman W. Zimmerman, Patented Sept. 9, 1930

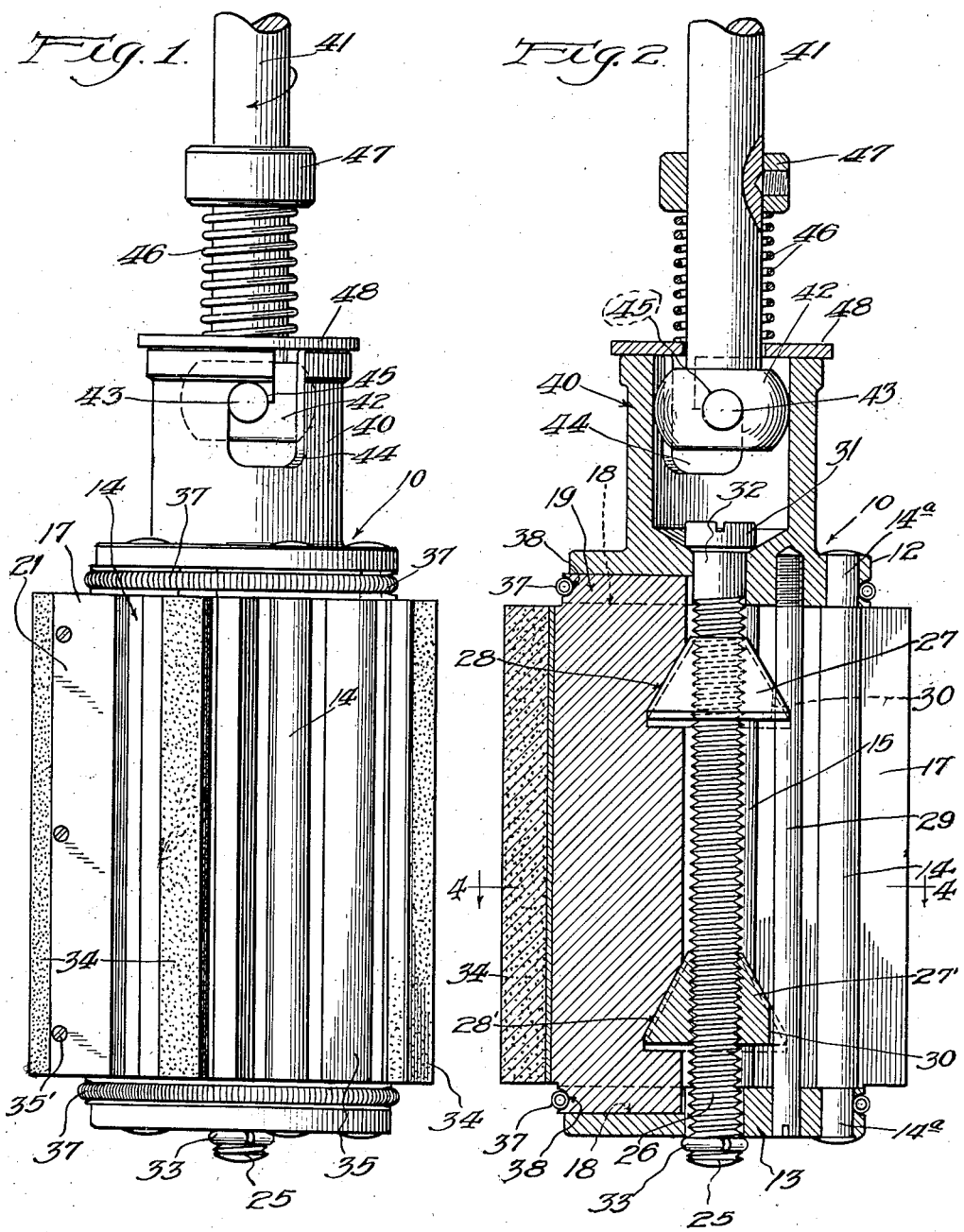

1,775,230

UNITED STATES PATENT OFFICE

FREDERICK G. WACKER AND HERMAN W. ZIMMERMAN, OF CHICAGO, ILLINOIS, ASSIGNORS TO AUTOMOTIVE MAINTENANCE MACHINERY CO., OF CHICAGO, ILLINOIS, A CORPORATION OF ILLINOIS

CYLINDER-GRINDING TOOL

Application filed May 31, 1927. Serial No. 195,216.

Our invention relates to a tool for use in grinding the bores of engine, pump or other cylinders, either in factory production-work or in the reconditioning of worn cylinders, to bring the surface of the cylinder-cavity to true cylindricity, accurate diameter and smooth finish throughout its length. Among the objects of the invention are to attain structural simplicity, manufacturing economy, low cost and rugged durability in the tool; to insure dependable accuracy and efficiency in its functioning; to secure ease of handling and working with the tool; and to minimize both the expense of abrading-stone substitutions and the amount of equipment that is necessary for grinding a large range of bore-diameters.

To attain these and other objects, which will become apparent to those skilled in the art from the following description, our invention consists in the features of construction and combinations of parts hereinafter set forth and claimed.

In the accompanying drawings—

Figure 1 is a side elevation of a tool embodying our invention;

Fig. 2 is a longitudinal section on line 2—2 of Fig. 4, with parts in elevation;

Fig. 3 is a plan view of the tool detached from its driving shaft;

Fig. 4 is a horizontal section on the line 4—4 of Fig. 2;

Fig. 5 is a perspective view of a stone-carrier;

Fig. 6 is a fragmentary view of the stone-carrier equipped with an "adapter" or extension-member, and Fig. 7 is a vertical section of a modified portion of the tool.

The tool body or frame, 10, is of "cage" construction simply and inexpensively made. The top and bottom end-plates, 12 and 13 respectively, are rigidly joined by equally spaced connecting rods or bars 14, arranged near the peripheries of the circular plates, so leaving open the center space 15 of the frame and the radial passages 16 between the bars. The frame-bars 14 and the end-plates are preferably made separately for convenience in machining and decreased cost, the bars being preferably of commercial rod-stock, having their end-portions reduced as at 14ª to form integral rivet-studs which pass through suitable apertures in the end plates and are upset for permanent, rigid connection with the end plates.

Stone-carriers 17 are arranged in the respective radial passages 16, for radial movement to expand or contract the working diameter of the tool, each such stone-carrier receiving sliding guidance wholly from the end-plates. Specifically, each of the end plates 12 and 13 has radial guide-grooves or channels 18 cut therein to receive slide-tongue portions 19 constituting the ends of the respective stone-carriers, these engaging parts being machined for requisite precision of sliding fit. Each stone-carrier 17 (as best shown in Fig. 5) has a blade-portion 20 the depth, or radial dimension, of which is much greater than its thickness, so that the end portions of the stone-carriers, forming the slide-tongues 19 may be of adequate length. Along its outer edge each blade has a head 21, much wider than the thickness of the blade, and channeled as at 22, to receive the abrading stone, such head being slightly shorter than the full length of the blade so as to leave free the slide-tongues 19 at the ends of the carrier. The spacing of the side-bars 14 preferably leaves these heads free from contact with the bars.

Five stone-carriers are preferably employed, so that no two carriers are in diametrically opposite position, but the number may be varied in the construction of the tool. The inner edges of all of the stone-carriers enter the center-space of the cage for coaction with an adjustable wedging means that will serve to control the diameter of the tool, positioning all of the stone-carriers at equal distances from the axis of the tool. Specifically, the adjusting means shown comprises a center-stem 25, screw-threaded as at 26 for engagement with the two wedge-members or spreader-cones 27, 27′, of identical taper, which engage correspondingly sloped wedge-surfaces 28 forming the upper walls of suitable recesses cut in the inner edges of blades 20. To prevent rotation of the cones a guide bar 29 is demountably screwed into the top end plate and extends through the bottom plate 13 to expose its kerfed end for screw-driver access, such guide-rod 29 engaging grooves 30 cut in the larger portions of the respective cones 27, 27'. The particular arrangement of the cones, and corresponding direction of the screw-thread on the center-stem and direction of slope of the wedge surfaces on the blade, may be varied with retention of some of the benefits of our invention, but it is desirable that the cones shall be arranged in tandem with their small ends upward. Thus the center-stem preferably takes form of a uni-directionally threaded bolt provided with a head-enlargement 31 bearing on the upper surface of the top end-plate 12 and kerfed for screw-driver adjustment as shown in Fig. 2. The bolt-receptive apertures in both end-plates may be of the same diameter, the bolt-stem having an un-threaded portion 32 to receive lateral bearing from the walls of the aperture in the top end-plate, and the lower threaded portion protruding through the aperture in the bottom plate with its protruding end annularly grooved to receive a snap-ring 33.

It will be apparent that with the stated construction the tool will work very effectively to maintain true cylindricity in its grinding or polishing operation, and will resist any tendency of the carriers to tilt out of parallelism even when working in a bore that is initially somewhat tapered. Circumferential pressure applied to the stone-carriers tends to wedge the carriers upwardly, so that not only the cones but also the elongated bearings of the ends of the upper guide-tongues 18 against the upper end-plate 12 of the frame, will act to prevent tilting of the stone-carriers. Also this coaction tends to keep the center-stem truly aligned with its bearing in the upper end-plate and prevents the screw-thread from wearing the lower bearing in end-plate 13.

The abrading-stones 34 are preferably mounted in respective sheet-metal shields 35 of channel-shape, to decrease the likelihood of stone-breakage, and the shielded stone is secured in the channel 22 of its respective carrier member 17 by set-screws 35'. Thus stone-renewal is easy and made at small cost. For varying the range of operation, stone-carriers having different depths of blades 20 may be employed, or "adapters" 36 may be used, as shown in Fig. 6. Each such adapter comprises a channeled head portion 36ª and a base portion 36ᵇ that is adapted to interfit in the normal head-channel 22 of the corresponding stone-carrier.

The several stone-carriers are free for radial removal from their guide channels, but the stone-carriers are normally spring-retracted to hold them firmly against the wedge-cones 27, 27'. Specifically, 37, 37 are elastic rings encircling said carriers and constantly pressing them inward, said spring-wire rings being seated in recesses 38 (see Fig. 5) in the outer ends of the guide-tongues 19, the perimeters of the cage-heads being preferably also grooved to receive said spring rings when the tool is in most-contracted condition.

For garage service, where the tool has to be detached frequently from its power-driven shaft, it is desirable that the connection to the drive shaft be made through a quick-detachable universal joint. Thus in Figs. 1 and 2 the upper end plate 12 has a sleeve extension 40 for coaction with the power operated drive-shaft 41 which rotates in the direction of the arrow, Fig. 1. On the shaft-end is a parti-spherical "ball" 42 having opposed pivot-studs 43 projecting laterally from its middle zone. These studs make bayonet lock engagement with the L-shaped slots 44 in the upper end of sleeve 40, the upper edge of the horizontal element of the slot having a hook projection 45. In operation, the shaft rotation always holds the pins 43 in hooked position as shown in Fig. 1 or directly below such position, and the connection thus far described is useful without auxiliary provision. However, to further provide against accidental detachment of the tool, a coiled spring 46 may surround the drive-shaft 41, bearing at its upper end against a fixed collar 47 and at its lower end bearing on a slide-plate 48 which loosely surrounds the drive-shaft 41 and makes slide bearing upon the top of the collar 40.

For production work, as in automobile factories where all cylinders to be ground are of substantially uniform diameter, it is not necessary to make the tool so readily detachable from its drive-shaft but the adjusting stem should be rotatable by means readily accessible from the side of the tool, preferably at its upper end. In the modified construction shown in Fig. 7 the sleeve 40' is connected with the drive-shaft 41' by any suitable universal joint 42'. A cross-shaft 50 traverses the sleeve and is rotatable by a screw-driver acting on either of its kerfed ends. On this shaft a bevel gear 51 is provided, meshing with a bevel gear 52, the hub of which is journaled in the end-plate 12' and is secured to the screw stem 25'.

It will be understood that in referring to abrading "stones", the term is used in a broad sense as referring to any abrading or polishing element for grinding or finishing work. It will also be understood by those skilled in the art that while specific, desirable structure for embodiment of our invention has been described in some detail, many changes may be made in details without departure from the spirit of the invention, within the scope of the appended claim.

We claim:

In a cylinder-grinding tool, the combination of a frame-cage comprising a pair of spaced end plates each having a plurality of radial grooves extending from their center to their outer edges, a plurality of spaced connecting bars rigidly secured to and connecting said end plates, means directly connected to one of said end plates for driving said frame cage, carrier devices rigidly supporting abrasive means and mounted in said frame-cage between said connecting bars, said devices having defined end tongues which snugly and slidingly fit into said end plate grooves to provide the sole guidance and lateral support for said carrier devices, a longitudinally fixed but rotatable threaded support mounted axially within said frame cage, and conical devices threaded upon said support and longitudinally movable with their smaller diameter ends extending in the same direction and toward the said driven end plate, means independent of said threaded support for preventing rotation of said conical devices, said carrier devices having surfaces shaped complementally to said conical devices and engaged by the latter to expand said carrier devices as said threaded support is rotated in one direction and to at all times wedge and hold said carrier devices rigidly in the grooves of the driven end plate.

In testimony whereof, we have subscribed our names.

FREDERICK G. WACKER.
HERMAN W. ZIMMERMAN.